United States Patent [19]

Iida

[11] 4,322,717
[45] Mar. 30, 1982

[54] RECORDING CHARACTER CONFIGURATION CHANGING SYSTEM

[75] Inventor: Kazuhiko Iida, Yokohama, Japan

[73] Assignee: Tokyo Shibaura Denki Kabushiki Kaisha, Kawasaki, Japan

[21] Appl. No.: 74,894

[22] Filed: Sep. 12, 1979

[30] Foreign Application Priority Data

Sep. 18, 1978 [JP] Japan ............................... 53-114425

[51] Int. Cl.$^3$ ...................... H04N 1/00; G03G 15/00
[52] U.S. Cl. ................... 340/146.3 AH; 340/1.463 H; 340/731; 346/108; 355/14 R; 358/300
[58] Field of Search ............. 340/146.3 AH, 146.3 H, 340/146.3 MA, 731, 736, 749, 798; 178/30; 355/14 R, 14 E; 354/5–10; 346/108; 358/300

[56] References Cited

U.S. PATENT DOCUMENTS

| 3,553,676 | 1/1971 | Raciti | 354/6 |
|---|---|---|---|
| 3,614,767 | 10/1971 | Carrell | 340/798 |
| 3,731,610 | 5/1973 | Kyte | 354/6 |
| 3,878,536 | 4/1975 | Gilliam | 178/30 |
| 3,893,100 | 7/1975 | Stein | 340/731 |
| 3,991,868 | 11/1976 | Robinson et al. | 340/731 |
| 4,087,808 | 5/1978 | Herndon | 340/731 |
| 4,089,008 | 5/1978 | Suga et al. | 340/731 |
| 4,107,664 | 8/1978 | Marino | 340/731 |
| 4,107,786 | 8/1978 | Masaki et al. | 340/731 |
| 4,153,896 | 5/1979 | White | 340/146.3 H |
| 4,175,851 | 11/1979 | Kitamura et al. | 355/14 R |
| 4,234,931 | 11/1980 | Kanaiwa et al. | 354/5 |

Primary Examiner—Leo H. Boudreau
Attorney, Agent, or Firm—Cushman, Darby & Cushman

[57] ABSTRACT

A recording character configuration changing system is provided with a pulse signal generator for producing pulse signals as a reference. The output signals from the pulse signal generator is inputted to a preset counter which changes the frequency of a signal inputted thereinto in accordance with a value set therein. The signal with the changed frequency is applied to a shift register for effecting parallel-serial convertion of a dot signal. As a result, the exposure time intervals due to the dot signal are changed to change the horizontal size of a character to be recorded. The recording character configuration changing system is further provided with a blanking counter. By setting a proper value into the blanking counter, a time interval between the starts of an exposure scanning to the succeeding exposure scanning is changed to change the vertical size of the character to be recorded.

12 Claims, 15 Drawing Figures

RECORDING CHARACTER CONFIGURATION CHANGING SYSTEM

BACKGROUND OF THE INVENTION

This invention relates to a recording character configuration changing system for changing a configuration of a recording character, which is adaptable for an electrophotographic recording system with an optical fiber tube.

One of the various electrophotographic recording systems successfully developed and put into practice in recent years is provided with an optical fiber tube (OFT) as an exposure device. In this recording system, the OFT effects line-scanning on the surface of the photosensitive drum to form an electrostatic latent image on the photosensitive drum. The latent image is developed by toner to be visualized and then the visualized image is transferred onto a recording paper and then is fixed to finally form a picture of information on the recording paper. In this type electrophotographic recording system, all the dot signals on the top row of a dot array representing each of those characters recorded on the first line of a recording paper are applied serially to the cathode of the OFT as video signals in the first scanning. In the second scanning, all the dot signals on the second row of the dot array are applied to the same as the video signals, similarly. The scanning is repeated for all the rows of one character dot array derived from the character signal generator. In this way, the characters on the first line on the recording paper are recorded.

Let us consider now a magnification of the recording character as an application of the recording system mentioned above. In this case, it is assumed that a time interval between the start of one scanning and the next scanning is fixed and that an exposure speed of an electron beam relative to photosensitive drum is uniform. For magnifying a character of a (vertical) by b (horizontal) into an enlarged character of 2a by 2b, a time interval between the starts of one dot recording and another dot recording is doubled for doubling the horizontal size of the character. This is realized by making half the frequency of a shift pulse applied to a shift register for shifting serial dot signals converted to be applied to the cathod of the OFT. Further, the number of scannings per one row of the dot array of each character when the characters are recorded, is also doubled. The scanning time for recording a character with a basic size is assumed to be one, for example. For recording a magnified or enlarged character with the horizontal size 2a, the scanning time is doubled for one line of each character. As mentioned above, in order to magnify the basic size character to a character of 2a by 2b, the frequency of the shift pulse is reduced half and the scanning of the same video signal is continuously repeated two times. A similar operation is applied for the magnifications of 3a×3b, 4a×4b, 5a×5b.

In the above-mentioned system, the magnification of the character is performed stepwise and not continuously. Practically, however, one often encounters a case needing characters with intermediate size between the adjacent sizes of the characters magnified by the above-mentioned system.

SUMMARY OF THE INVENTION

Accordingly, an object of the invention is to provide a recording character configuration changing system which can change the vertical and horizontal sizes of a character individually and substantially continuously, and thus change a configuration of a character into a proper configuration for example, a vertically or horizontally elongated or entirely enlarged configuration, by using a single character generator.

To achieve the above object, there is provided a recording character configuration changing system adaptable for an electrophotographic recording system in which dot signals are produced by controlling a character generator in accordance with characters to be recorded, and an exposure section of a line scanning type, when receiving the dot signals produced, records characters corresponding to the dot signals on a recording medium moving at a constant speed, comprising:

means for changing one of the sides of a character by fixing the scanning speed of an exposure scanning of the exposure section but changing a time interval between the starts of one exposure scanning and the next exposure scanning; and means for changing the other side of the character by changing an exposure interval between adjacent dot signals in the exposure section.

Other objects and features of the invention will be apparent from the following description taken in connection with the accompanying drawings, in which:

DETAILED DESCRIPTION OF THE PREFERRED EMBODIMENT

Figure 1:
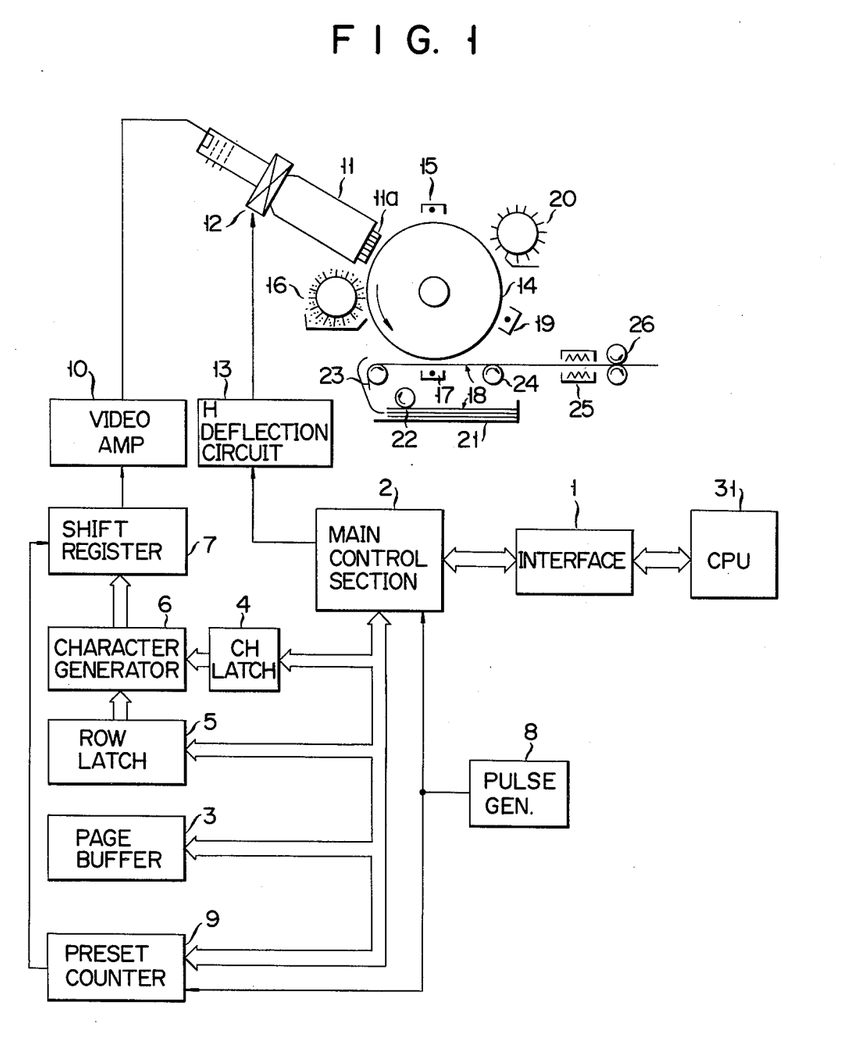
FIG. 1 shows a block diagram of an electrophotographic recording system to which the invention is applied.
Figure 5A:
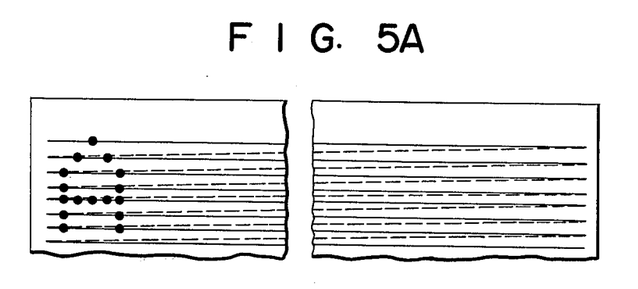
FIG. 5A shows a recording character configuration and scanning loci when '3' is preset in a counter.

FIG. 1 shows a block diagram of an electrophotographic recording system with an optical fiber tube according to the invention. In the figure, an interface circuit 1 intervening between a data supply unit such as CPU 31 and a main control section 2, transfers data to and from the CPU 31 and the main control section 2. The main control section 2, which controls the whole recording system, is connected to a page buffer 3, a character selection latch circuit 4 as a first memory circuit, and a row selection latch circuit 5 as a second memory circuit. The page buffer memory 3 with a memory capacity of recorded data on one page of a recording paper stores character codes corresponding to the data recorded on one page recording paper supplied from the main control section 2. The character codes stored in the page buffer memory are sequentially taken out character by character and then is loaded into the character selection latch circuit 4 with a memory capacity of one character code. The character selection latch circuit 4 stores one character code supplied from the main control section 2 as record character selection information. The row selection latch circuit 5 stores data to select dot information arranged on a proper row of a dot pattern of one character selected by the character selection latch circuit 4. Such dot-data selection information are supplied from the main control section 2. The character selection latch circuit 4 and the row selection latch circuit 5 are coupled with a character signal generator 6. The character signal generator 6 receives the character code signal from the character latch selection circuit 4 and the information stored in the row selection latch circuit 5, and produces dot information of a dot matrix of 5×7, for example, as shown in FIG. 5. The dot information outputted in parallel from the character generator 6 and applied to a shift register 7. A pulse generator 8 produces clock pulses to synchronize the operation of the overall system, and supplies them to the main control section 2 and the preset counter 9. The preset counter 9 produces a shift signal under control of the main control section 2 which in turn is applied to the shift register 7. The shift register 7, while being synchronized by the shift signal from the preset counter 9, converts parallel dot information derived from the character signal generator 6 into serial dot information which are transferred bit by bit to a video amplifier 10. The video amplifier 10 amplifies a signal derived from the shift register 7 and applies it as a video signal to a cathode of an optical fiber tube 11. To a deflection coil 12 of the OFT 11, a horizontal deflection synchronous signal produced from the main control section 2 is applied through a horizontal deflection circuit 13.

In the OFT 11, an electron beam produced by a video signal derived from the video amplifier 10 is deflected by the horizontal deflection coil 12 thereby to scan on the fluorescent surface of its face plate 11a. The beam scanning excites the fluorescent material on the face plate 11a to radiate light in the form of a given dot image. The dot image is then introduced onto a photosensitive means, for example, a photosensitive drum 14 disposed close to the face plate 11a. The photosensitive drum 14, rotating in an arrow direction, is charged by a electric charger 15, and is exposed to the beam scanning by the OFT 11. Through the exposure, an electrostatic latent image is formed on the surface of the photosensitive drum 14. The drum 14 bearing the electrostatic latent image further rotates to go by a developer 16. The developer 16 develops the electrostatic latent image by using toner to visualize it with attachment of toner thereunto. With further rotation of the drum 14, the developed image reaches a transfer stage of a transfer charger 17 where toner on the latent image is attracted onto a recording medium such as recording paper 18 charged by the charger 17. After the transfer of the latent image, the photosensitive drum 14 reaches an electric removal stage of an electric remover 19 where charges on the drum 14 are removed by applying a high AC voltage to the remover 19. Further, the electrostatic latent image is erased by illumination of a fluorescent lamp (not shown). A little amount of toner remaining on the surface of the photosensitive drum 14 is cleaned by a cleaner 20 and the photosensitive drum is ready for the next image recording process.

The recording paper is taken out from a cassette 21 by a take-out roller 22 in synchronism with the rotation of the photosensitive drum 14, and is transported to the transfer stage 17 by transporting roller 23. The recording paper 18 intimately contacts with the drum 14 at the charger 17 so that the developed image on the drum 14 is transferred onto the recording paper 18. After emanating from the transfer stage, the recording paper 18 enters a fixing stage designated as a fixing device 25 where the transferred image is fixed, and then is further transported to the output stacker (not shown) by the output roller 26.

The details of the information recording system conceptionally illustrated in FIG. 1 will be described with reference to FIGS. 2A and 2B. In FIG. 2B, an information input section (II) 31 receives data (ASCII code) transferred from an exterior information supply unit under control of a control signal and applies the information to a distributor (DIST) 32 through a bus (DA) 166 connected to the information input section 31. The information input section (II) 31 is comprised of, for example, a latch circuit to latch one character. The information input section 31 produces a control signal STB 168 for transfer to the distributor 32 while the distributor 32 produces a busy signal (BU) 167 to the information input section (II) 31. The distributor 32, comprised of a multiplexer, for example, distributes the information received from the information input section 31 to the respective related circuits. When receiving a character size information, the distributor 32 transfers the vertical size information to a code converter (CC3) 33 shown in FIG. 2A connected to the distributor 32 and transfers the horizontal size information to a code converter (CC2) 34 connected to the distributor 32. When receiving a character code, the distributor 32 transfers it to a code converter (CC1) 35 connected to the distributor 32. At this time, the distributor 32 produces write control signals WRT3 36, WRT2 37, and WRT1 38, in accordance with the input control information inputted thereinto. A control signal ADCK1 39 is outputted from the distributor 32 in order to count up an address counter (AD) 40 after the WRT1 signal 38 is outputted. When receiving a line feed information, the distributor 32 produces a control signal LCK1 41 which in turn is applied to a line counter 42 through a selector (SLCT2) 78 connected to the distributor 32. Upon receipt of the control signal 41, the line counter 42 is counted up. When print start information is applied to the distributor 32, the distributor 32 produces a control signal PESTB 44 to store the final line number into a page end register (PER) 43. When information representing the number of printing material to be printed, for example, documents is applied to the distributor 32, the distributor 32 transfers a control signal CNT 46 for designating the number of the printing material to a start controller (SC) 45.

When the information is inputted to the information recording system, the start controller (SC) 45 connected to the distributor 32 produces a clear signal (CLR) 47 to initialize the address counter 40, the line counter 42 and the like and directs the distributor 32 to initiate the information input. When receiving the print start information by the control signal CNT 46, the start controller 45 produces a clear signal (CLR) 47 and a print start signal (START) 48. When receiving a page end signal (PE) 49 through an AND circuit (AND4) 53, the start controller 45 renders the START signal 48 low in level. The start controller 45 is comprised of a decoder and other proper circuit components. A flip-flop (FF5) 50 coupled with the start controller 45 responds to the START signal 48 to produce a PRINT signal 52 in synchronism with a horizontal synchronizing signal (HSYNC) 51 equivalent to the signal $Q_2$ 106. The page end signal 49 is produced from the AND circuit (AND4) 53 when the final row of a dot matrix on the end line is scanned.

A stop address memory (SPM) 54 stores an address signal PBAD from the page buffer 55, which stores the final character codes of the respective lines of the character code stored in the page buffer (PB) 55 into the address of the memory 54 per se indicated by a line count signal (LCNT) 57 every time the distributor 32 applies the write signal 56 into stop address memory 54. At the time of printing, the stop address memory 54 produces a final character code address of the line indicated by the LCNT 57. A comparator (COMP1) 58 compares a page buffer address signal (PBAD) 59 of a character now being printed stored in the page buffer 55 with the final address signal (SPAD) 60 on the line now being printed. When those values are equal to each other, it produces a column end signal to prohibit the FF4 (76) from receiving the LD1 signal by the AND gate (AND2) 62.

The line counter (LC) 42 counts a clock signal (LCK2) produced from the selector (SLCT2) 78 as a clock. The counter 42 which is an up-counter, counts up by the clock signal (LCK1) every time that it receives the line feed instruction. The output of the counter 42 is connected to a vertical size memory (VSM) 67, a horizontal size memory (HSM) 68, the stop address memory (SPM) 54, the start address register (SAG) 84, a comparator (COMP2) 69, and a page end register (PER) 43. In the printing operation, a line end signal (LEND) causes the counter 42 to count up at the end of each line.

When the page end register 43 receives a print start instruction in the data input operation, a control signal (PESTB) 44 derived from the distributor 32 causes the page end register 43 to store the contents of the line counter 42. In other words, the page end register 43 latches the number of rows at the final line. In the printing operation, this value also is outputted to the comparator (COMP2) 69 to know the page end. The comparator 69 compares the number of lines (LCNT) 57 currently being printed with the number of the page end line 70. When both are coincident with each other, it reports the page end to the start controller 45. The AND gate (AND3) is used to prevent a write signal WRT 5 from inputting data into the address counter (AD) 40. In the other operation than the printing, the OR gate 72 resets the character register (CR) 73 while, in the printing operation, it resets the character register 73 between lines spaces (a line with a space code printed thereon). The selector (SLCT1) 74 produces the ADCK 1 signal 39 as the ADCK2 signal 75 in the data inputting operation. In the printing operation, the output signal Q4 77 of the flip-flop (FF4) is outputted as the ADCK2 signal 75. The selector (SLCT2) 78 produces the LCK1 as the LCK2 signal 65 in the data input operation while it produces the LEND signal 79 as the LCK2 signal 65 in the printing operation.

The AND gate (AND2) 62 prohibits the address counter 40 of the page buffer 55 from being further counted up when the scanning is made until the end of each line.

The flip-flop (FF4) 76 delays the LD1 signal 64 by one clock of the reference signal (OSC2) to count the address of the page buffer 55.

A vertical size memory (VSM) 67 writes the vertical size information of a character outputted from the code counter (CC3) 33 into the address indicated by the LCNT signal 57 in response to the write signal (WRT3) 36, thereby to record the vertical size of each line. The output of the VSM 67 is supplied to a blanking counter (BCNT) 81 and a divider (DIV2) 82. The horizontal size memory (HSM) 68 writes the horizontal size information of a character produced from the code converter (CC2) 34 into the address indicated by the LCNT signal 57 in response to the write signal (WRT2) thereby to store the horizontal size of each line. In the printing operation, its output is supplied to the horizontal size counter (HSC) 83 to determine a time per dot. The page buffer (PB) 55 writes the character code outputted from the code converter (CC1) 35 into the address indicated by the address counter (AD) 40 in response to the write signal (WRT1). In the printing operation, it produces the contents of the address indicated by the address counter 40 into the character register (CR) 73. The page buffer 55 is capable of accommodating data of one or more page. The length of one line is variable. The code converter (CC1) 35 converts the character code (ASCII code) of PBD into the internal code of a pattern matrix memory (PMM). The code converter (CC2) 34 converts the character size information of HSD 162 into the internal code corresponding to HSM 68. The code converter (CC3) 33 converts the character size information of VSD 161 into the internal code corresponding to VSM 67.

The address counter 40, which is an up-counter of the preset type, counts up, in writing the character code into the page buffer 55, by a control signal ADCK1 39 outputted after the write signal (WRT1) 38 is outputted. In the printing operation, the start address of each line from the SAG 84 is preset in the address counter 40 in synchronism with the write signal WRT5. The address counter 40 with the preset start address is counted up by a signal Q4 produced at the end of each character. The production of the signal Q4 stops at the time point that the end character of each line is printed. Accordingly, no further counting-up of the address counter (AD) 40 is performed. The start address Register (SAG) 84 is a register with a capacity enough to store 1 Pluse a value of a SPAD signal 60 indicating the address of end character on the preceding line of those characters stored in the page buffer 55, and to store one address. The character register (CR) 73, connected to the page buffer 55, latches one character code produced from the page buffer 55. The decoder (DC1) 90 receives an output signal from the dot line counter (DLC) 89 and produces decoded information during a line space to clear the character register (CR) 73. The decoder (DC2) 91 receives an output signal from the dot line counter (DLC) 89 and produces decoded information at an instant that the printing of one line in atext is completed. The divider 82 determines the number of scannings for dots arranged in one row of a dot pattern depending on the contents of an output signal (VL) from the vertical size memory. The blanking counter (BCNT) 81, which is a preset type down counter, presets the contents of the signal (VL) when an output signal from the decoder (DC4) 92 is logical '1', and determined the blanking time when an output signal 96 from a decoder 95 is logical '1'. An unblanking counter (UBCNT) 97 is a preset type down-counter and in operation presets an output signal (CL) 99 from the constant circuit 98 when the signal DLCK 94 is logical '1', and determines the scanning time when an output signal (EN1) 100 from the decoder 95 is logical '1'. The decoder (DC3) 95 produces a signal of logical '1' when the contents of the blanking counter 81 is zero. A decoder (DC4) 92 produces logical '1' when the contents of the unblanking counter 97 is zero. The constant circuit (CONST) 98 produces a fixed value determining a fixed time.

A flip-flop (FF1) 101 synchronizes the signal (EN1) 100 (original signal of the horizontal synchronizing signal) with the reference signal OSC2 80. A flip-flop (FF2) 102 is used to delay an output signal Q1 from the FF1 101 by one clock of the reference signal OSC2 80 to form a horizontal synchronizing signal. A flip-flop (FF3) 103 delays by one clock an output signal (Q2) 106 from the flip-flop (FF2) 102. The AND circuit (AND1) 107 produces one pulse of one clock of the reference signal OSC2 80 continuous from the trailing edge of the horizontal synchronizing signal (HSYNC). An oscillator (OSC) 108 is connected with a divider (DIV1) 109 and horizontal size counter (HSC) 83. The divider 109 frequency-divides an output signal (OSC1) from the oscillator 108 to produce a clock signal (OSC3) 105.

The horizontal size counter (HSC) 83, which is a preset type down-counter, presets an output signal (HL1) 111 of the horizontal size memory (HSM) when the reference signal (OSC2) 80 is logical '1' and determines a time permitting the dot of the character pattern. The decoder (DC5) 112 produces logical '1' when the output signal (HL2) from the horizontal size counter (HSC) 83 is zero. A horizontal dot counter (HDC) 113 is a counter to determine the number of dots (including a character space) in one character horizontal direction, and is cleared during the blanking by a signal Q2 106. The horizontal dot counter uses the reference signal (OSC2) 80 as a basic clock (up-counter). The decoder (DC6) 63 produces a signal of logical '1' as an output signal LD1 64 when the HDL 114 produced from the horizontal dot counter (HDC) 113 reaches a predetermined maximum value, and counts up the address of the page buffer 55.

Figure 2A:
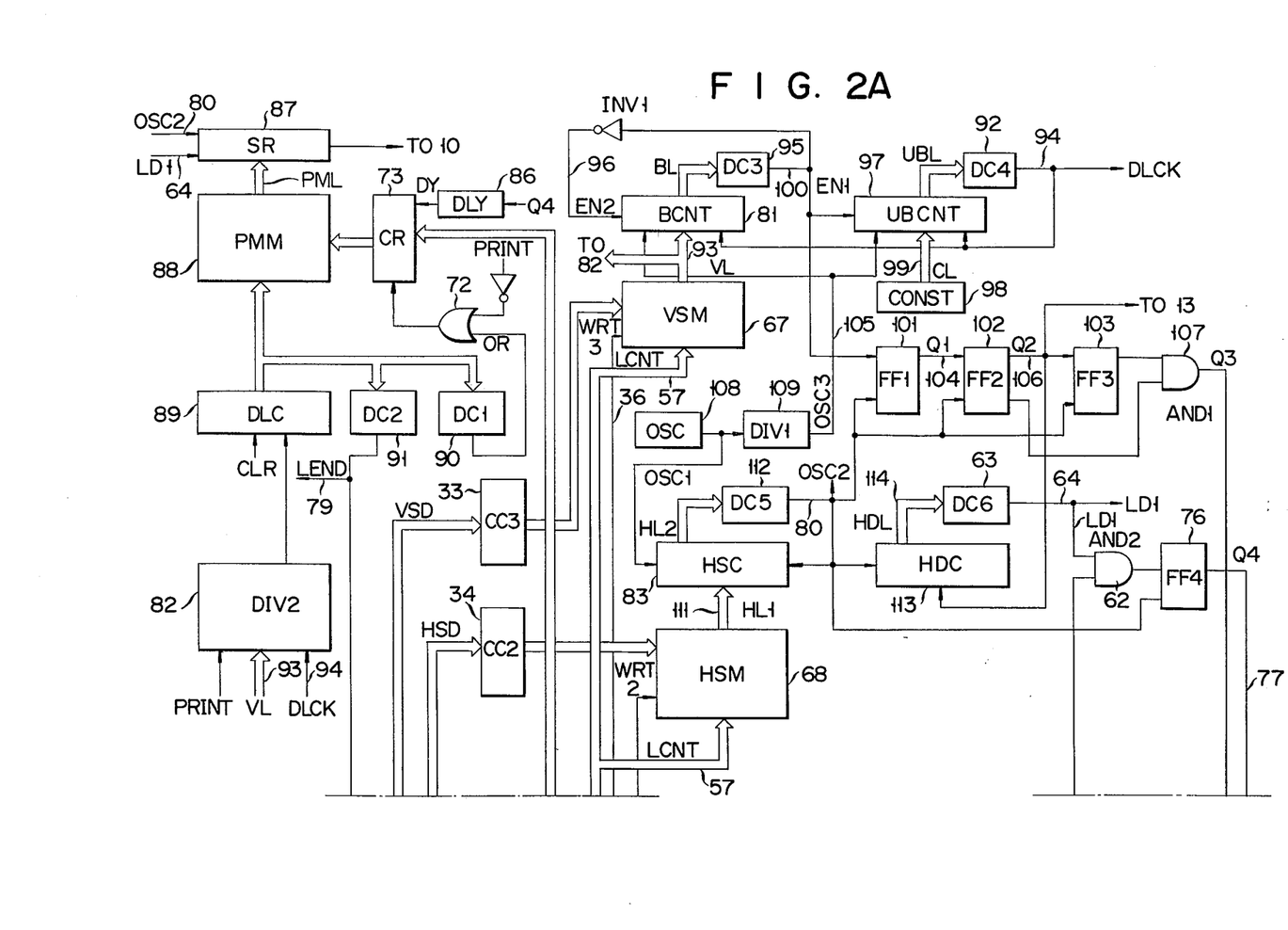
FIGS. 2A and 2B cooperate to form a circuit diagram of the electrophotographic recording system shown in FIG. 1.
Figure 2B:
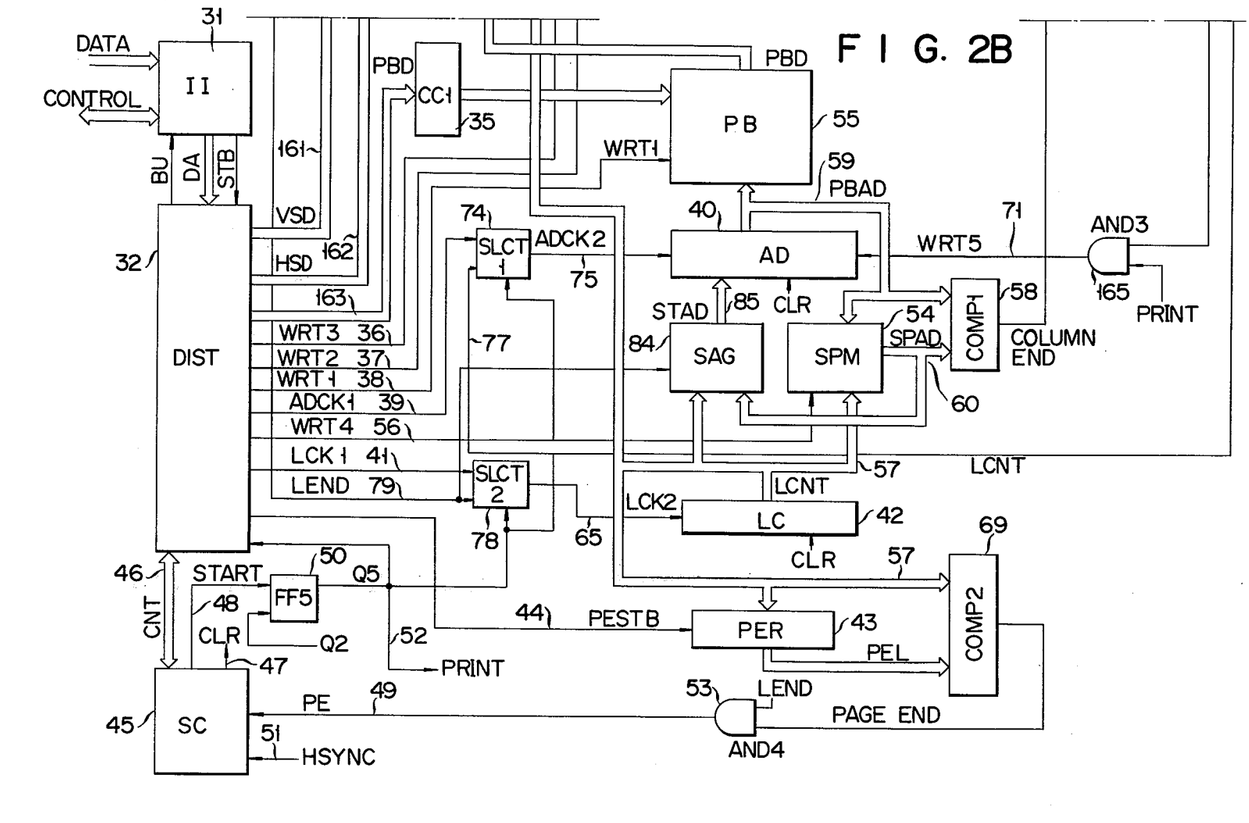

In FIGS. 2A and 2B, the information input circuit 31 corresponds to the interface circuit 1 shown in FIG. 1; the oscillator (OSC) 108 to the pulse generator 8; the horizontal size counter (HSC) 83 to the preset counter 9; the page buffer memory 55 to the page buffer 3; the dot line counter (DLC) 89 to the row selecting latch circuit 5; the character register (CR) 73 to the character selecting latch circuit 4; the pattern matrix memory (PMM) 88 to the character generator 6; the shift register (SR) 87 to the shift register 7. The address counter (AD) 40, the start address register (SAG) 84, the stop address memory (SPM) 54, and the comparator (COMP1) 58 cooperate to form a direct memory access (DMA). The remaining portion in the circuit shown in FIGS. 2A and 2B corresponds to the main control section 2 in FIG. 1.

Figure 4:
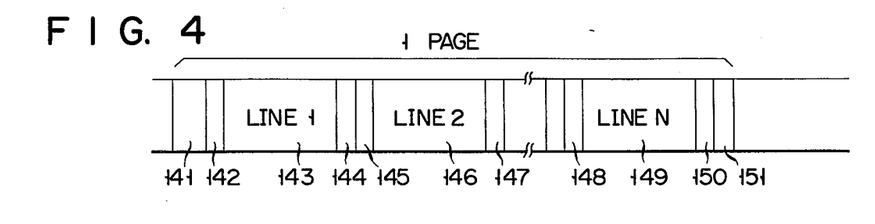
FIG. 4 shows a format of an information signal including control information and data supplied to information input section shown in FIG. 3.

Turning now to FIG. 4, there is shown a format of the information of one page supplied from the CPU. In the figure, a field 141 control information is the information to designate the number of copies, for example; a field 142 the size information on the first line (including vertical and horizontal information); a field 143 the information of the character codes on the first line; a field 144 line feed information. Similarly, fields 145 and 148 the size information on the second line and the Nth line (including the vertical and horizontal information). Fields 146 and 149 are character code information on the second and the Nth lines. Fields 147 and 150 are line feed information on the second and the Nth lines. A field 151 is control information of the printing start.

The symbols used in the drawings are listed below.

Register

SR: Shift register
CR: Character register
SAG: Start address register
PER: Page end register

Memory

PMM: Pattern matrix memory
VSM: Vertical size memory
HSM: Horizontal size memory
SPM: Stop address memory

Counter

DLC: Dot line counter
BCNT: Blanking counter
UBCNT: Unblanking counter
HSC: Horizontal size counter
HDC: Horizontal dot counter
AD: Address counter
LC: Line counter

Decoder

DC1: Decoder 1
DC2: Decoder 2
DC3: Decoder 3
DC4: Decoder 4
DC5: Decoder 5
DC6: Decoder 6

Divider

DIV1: Divider 1
DIV2: Divider 2

Flip-flop

FF1: Flip-flop 1
FF2: Flip-flop 2
FF3: Flip-flop 3
FF4: Flip-flop 4
FF5: Flip-flop 5

Gate

AND1: AND gate 1
AND2: AND gate 2
AND3: AND gate 3
AND4: AND gate 4
OR: OR gate

Converter

CC1: Code converter 1
CC2: Code converter 2
CC3: Code converter 3

Comparator

COMP 1: Comparator 1
COMP 2: Comparator 2

Selector

SLCT 1: Selector 1
SLCT 2: Selector 2

Others

II: Information input circuit
DIST: Distributor
SC: Start Controller
DLY: Delay circuit
CONST: Constant circuit
OSC: Oscillator
PB: Page buffer The operation of the information recording system mentioned above will be described with reference to FIGS. 2A and 2B. Let us first consider the input of information. When the address counter 40 and the line counter 42 are cleared, data is received by the information input circuit 31. The data received enters through the bus DA to the distributor 32. The first data is the control information to designates the number of copies, for example, and therefore is transferred to the start controller 45.

Then, when the vertical size information of the character is inputted, the distributor 32 produces the vertical size information for the code converter (CC3) 33. The code converter 33 effects the code conversion of the vertical size information and the code-converted information is written into the first address (corresponding to the first line) of the vertical size memory (VSM) 67 by the write signal (WRT3) 36. Succeedingly, when the horizontal size information of the character is inputted, the distributor 32 transfers the horizontal size information to the code converter (CC2) 34. The code converter 34 in turn effects the code-conversion of the horizontal size information and the code-converted information is written into the first address (corresponding to the first line) of the horizontal size memory (HSM) 68 by the write signal (WRT2) 37. Then, when the first character code on the first line is inputted, the distributor 32 transfers the character code to the code converter (CC1) 35. The code converter (CC1) 35 code-converts the character code (ASCII code) into a given binary code, for example.

The character code which is code-converted is written into the first address of the page buffer 55 by the write signal (WRT1) 38. After this, the address counter 40 is counted up by +1 in response to the address clock signal (ADCK2) 75. Succeedingly, when the second character on the first line is inputted, it is stored in the second address of the page buffer 55 and the contents of the address counter 40 is simultaneously incremented by one count. The operation continues until the line feed information is inputted.

When the line feed information is inputted, the write signal (WRT4) 56 is outputted and the address signal (PBAD) 59 of the page buffer 55 storing the final character code on the first line is stored in the first address (corresponding to the first line) of the stop address memory 54. Then, the distributor 32 writes code '0' representing a blank (space character) in the matrix of the pattern matrix memory 88 into the page buffer 55 to count up the address counter 40 by one count for preparation for the next line storage. Accordingly, the blank character is always written into the address of the page buffer 55 storing the final character. The line counter 42 is counted up by the clock signal LCK1 (indicating a line 2).

Then, when the character size information on the second line is inputted, the vertical size information of the character is code-converted and written into the address (second address) of the vertical size memory (VSM) 67 indicated by the LCNT. The horizontal size information is code-converted and written into the address (the second address) of the horizontal size memory 68 indicated by the LCNT. Then the character information is code-converted and written into the location of the page buffer 55 indicated by the address counter 40 in response to the write signal 38. And the address counter 40 is counted up. The 2nd, 3rd, 4th, . . . nth character code information on the second line will be performed in the similar way.

Then, when the line feed information is inputted, the write signal (WRT4) 56 is outputted as in the case of the first line, and the address signal 59 of the page buffer 55 storing the final character on the second line is stored in the second address (corresponding to the second line) of the stop address memory 54. Then, the distributor 32 writes code '0' (space character) into the page buffer 55 to count up the address counter 40. Further, the line counter 42 is counted up. Similarly, the information on line 3, line 4, . . . line n are stored and the line feed information 150 on the final line is inputted and then the print start information 151 is inputted. As a result, the count-up of the line counter 42 is not performed and the distributor 32 produces the control signal (PESTB) 44, and the page end register 43 stores the number of the total lines in atext. Additionally, the distributor 32 transfers the print start control signal 46 to the start controller 45. The start controller 45 produces the clear signal (CLR) 47 to reset the respective counter to produce the START signal 48, resulting in start of the printing operation.

When the START signal is outputted, the control signal PRINT is distributed to the respective circuits, in synchronism with the horizontal synchronizing signal HSYNC. Upon the signal distribution, the selector 74 and the selector 78 select the output signal Q4 and the line end signal 79. The dot line counter 89 is cleared so that the first row of each character is addressed. Since the address counter 40 is also cleared, the first character on the first line is applied from the page buffer 55 to the character register (CR) 73. At this time, the contents of the character register (CR) 73 are already cleared. The output signal Q4 77 is outputted at the start of one character and is applied to the input of the delay circuit 86. Then, the circuit 86 produces a delay signal DY (corresponding to two or three dots). When the delay signal DY is produced, the character register 73 latches the first character code on the first line produced from the page buffer 55. This code becomes the address information of the pattern matrix memory 88 to make an access to the memory 88. At this time, the output signal PML from the pattern matrix memory 88 includes the dot information on the first row of the first character on the first line. When the signal 114 produced from the horizontal dot counter 113 becomes largest, the dot information are inputted into the shift register 87 by the LD1 signal 64 of logical '1' (the LD1 signal is produced at the final dot, i.e. the 5th dot in the case of a dot matrix of $5 \times 7$). At the same time, the dot information are shifted dot by dot by the signal OSC2 80 produced from the decoder 112. After the signal LD1 64 is outputted, the signal Q4 77 is produced after one dot and the address counter 40 is counted up, with the result that the page buffer 55 produces the character code information (PBD) of the second character of the first line. Then, the output signal Q4 77 from the flip-flop 76 is applied to the delay circuit 86 and the DLY 86 produces a delay signal DY. The contents of the PBD (the second character code on the first line) all latched in the character register 73. The dot information of the first row of the first character on the first line are all outputted in series so that the signal 64 is inputted to the shift register 87. As a result, the dot information on the first row of the second character on the first line are latched in the shift register 87 and are outputted in series in synchronism with the signal OSC2 80. In this way, the dot information are outputted as the first row video signals of the signals to be printed on the first line, and when the final character on the first line is printed, the output signal PBAD 59 of the address counter 40 is coincident with the output signal SPAD 60 from the stop address memory 54, so that the comparator (COMP1) 58 produces a column end signal to stop the count-up of the address counter 40. As a result, no video signal is produced from the shift register 87.

Under the blanking (no video signal is produced), the scanning progresses to reach the scanning end (the end of HSYNC). At this time, the output (DLCK) 94 from the decoder 92 is outputted and is inputted to the dot line counter 89 through the divider 82 (in this case, the value of the DLCK is assumed to go to the dot line counter 89 without being changed). Upon this, the dot line counter 89 is counted up by one count to access to the dot information on the second row of the pattern matrix memory 88. Further, when the horizontal synchronizing signal (HSYNC) falls, the write signal WRT 5 is outputted so that the address counter (AD) 40 presets the contents of the start address register 84 therein. In this case, however, since the contents of the line counter 42 is cleared, the contents of the start address register 84 is also cleared so that the address counter 40 becomes again in clear condition. As a result, the column end signal also is released, so that the scanning of the second row initiates at the leading edge of the horizontal synchronizing signal (HSYNC) thereby to effect the printing of all the dots of the second row of those dots of the characters to be printed on the first line, as in the case of the scanning of the first row.

In a similar way, the scannings of the third and fourth rows are performed and, at the end of the Nth row scanning, the decoder (DC1) produces a signal to clear the character register 73 during the line space (from the instant that the signal of DC1 90 until the signal DC2 91 is outputted) and to inhibit the video signal. When the character register 73 is cleared, the dot information of the pattern matrix are all '0'. Succeedingly, when the line space ends, the line end signal LEND 79 is produced from the decoder DC2 91, so that the contents of the line counter 42 is counted up at the trailing edge of the output signal so as to print the second line. At this time, the start address register 84 increments by one the address of the page buffer 55 storing the final character on the first line and latches it. Therefore, the address incremented indicates the address of the page buffer 55 storing the first character code on the second line. As in the case of the first line printing, the print of the second line is performed. Similarly, the 3rd, 4th, . . . nth lines are printed succeedingly. When the last line is printed, the page end register 43 is coincident with the line counter 42, and the comparator 69 produces a page end signal. Further, when the last row of the last line is scanned, the page end signal is outputted through the AND circuit (AND4) 53 to the start controller 45. As a result, the start controller 45 renders the START signal logical 'low' to complete the print of one page.

An example of the recording state obtained in this manner is shown in FIG. 5.

Figure 5B:
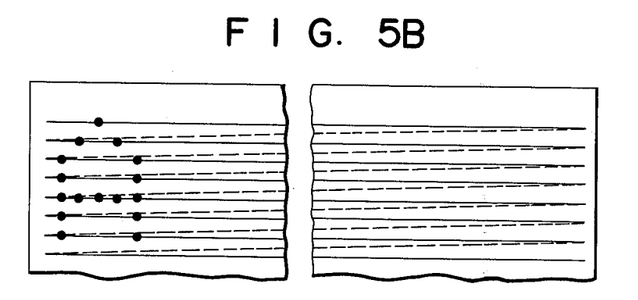
FIG. 5B shows another recording character configuration and scanning loci when '4' is preset in the counter.
Figure 5C:
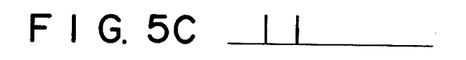
FIG. 5C shows a pulses representative of a video signal at the second scanning of FIG. 5A.
Figure 5D:
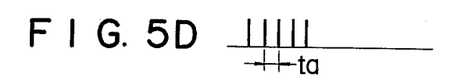
FIG. 5D shows pulses representative of a video signal at the fifth scanning of FIG. 5A.
Figure 5E:
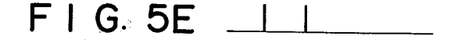
FIG. 5E shows pulses representative of a video signal at the second scanning of FIG. 5B.
Figure 5F:
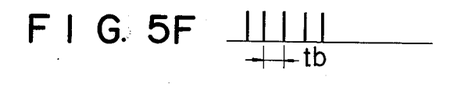
FIG. 5F shows pulses representative of a video signal at the 5th scanning of FIG. 5B.

The recording character configuration changing system according to the invention will be described with reference to FIG. 1 and FIGS. 5A to 5F. Assume now that the character shown in FIG. 5A has the smallest size of a recordable character, and that the corresponding sides of the characters shown in FIGS. 5A and 5B are related with the ratio of 3:4. The main control section 2 sets '1' to '16', for example, in the preset counter 9 during the line space. When '1', for example, is set in the counter, the frequency of the output signal (corresponding to the frequency of the shift pulse) from the preset counter 9 is equal to that of the signal outputted from the pulse generator 8. When '2' is set therein, the output frequency is $\frac{1}{2}$ of the output frequency of the pulse generator 8. Similarly, when '3' to '16' are set therein, the output frequency are $\frac{1}{3}$ to 1/16 of the output frequency of the pulse generator 8. The dot signal corresponding to the number of dots in the horizontal direction in one character code is supplied to the shift register 7 during the character space, and is then outputted to the video amplifier 10 as a serial signal in synchronism with the shift pulse produced from the preset counter 9. The smallest character shown in FIG. 5A corresponds to a case where '3' is preset in the counter 9. The character shown in FIG. 5B corresponds to a case where '4' is preset in the counter 9. FIGS. 5C and 5E are video signals at the second scanning in FIGS. 5A and 5B. FIGS. 5D and 5F are video signals at the 5th scanning in FIGS. 5A and 5B. The ratio of the time difference $t_a$ to $t_b$ of adjacent dot signals is 3:4. Thus, with respect to the magnification of the horizontal size of a character, by changing the exposure interval by the dot signal in accordance with the value set in the counter 9, the horizontal size of a character may be changed 4/3, 5/3, 6/3, . . . 16/3 times as large as that of the smallest character.

The magnification of the vertical size of a character is made by properly selecting a time interval between the starts of one exposure scanning and the next exposure scanning. The ratio of the time intervals in FIGS. 5A and 5B is 3:4. The electron beam of the OFT 11 waits in blanking condition until the exposure scanning starts. Those controls are performed by changing the period of a horizontal synchronizing signal supplied to a horizontal deflection circuit 13.

In summary, the magnification of the horizontal size of a character is performed in such a manner that a value of the horizontal size memory 68 storing a character size designated each line presets the horizontal size counter (HSC) 83 which is a preset type down counter to change the time that one dot video signals each of one dot are serially outputted.

The magnification of the vertical size of a character is performed in a manner that, with a fixed scanning time Ts (during a period that the horizontal synchronizing signal is high), the blanking time $T_B$ (during a period that the horizontal synchronizing period is low), is changed. In this case, during the time period Ts, the exposure speed of the electron beam of the OFT is fixed.

Figure 3A:
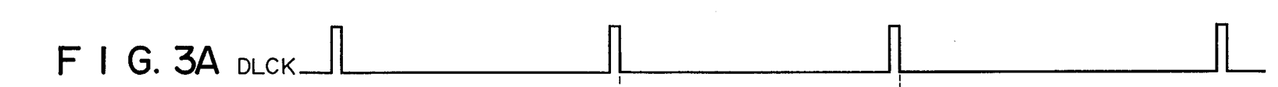
FIG. 3A shows a timing chart of a DLCK signal.
Figure 3B:
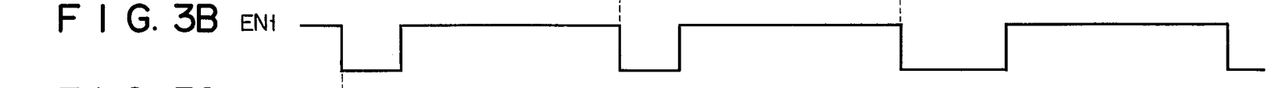
FIG. 3B shows a timing chart of an ENI signal.
Figure 3C:
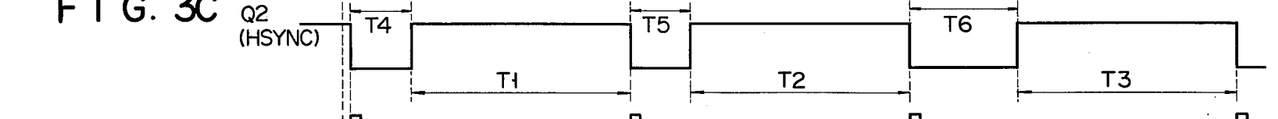
FIG. 3C shows a timing chart of a signal Q2.
Figure 3D:
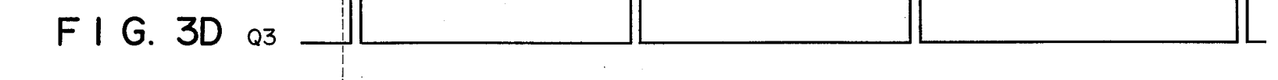
FIG. 3D shows a timing chart of a signal Q3.
Figure 3E:
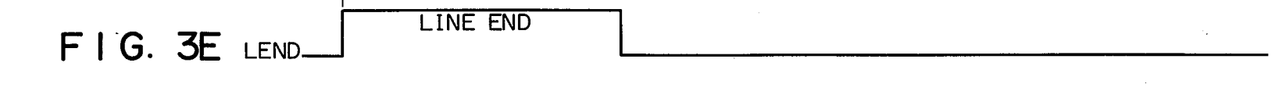
FIG. 3E shows a timing chart of a LEND signal.

In FIGS. 2A and 2B, the decoder (DC3) 95 and the decoder (DC4) 92 produce output signals of logical '1' when the contents of the blanking counter (BCNT) 81 and the unblanking counter (UBCNT) 97 are zero. Those counters 81 and 82 preset a VL signal 93 and a CL signal 99 therein when a DLCK signal 94 is logical '1'. At this time, an output signal EN1 100 of the decoder (DC3) 95 is logical '0' so that the unblanking counter 97 does not count while the blanking counter 81 counts down. The blanking counter 81 counts down from the value preset and when its value becomes zero, the output signal EN1 100 from the decoder (DC3) 95 becomes logical '1' and the unblanking counter 97 starts to count down from the preset value. At this time, the EN2 96 becomes logical '0', so that the blanking counter 81 does not count. When the unblanking counter 97 counts down to be zero, it produces a DLCK signal 94 (FIG. 3).

The blanking time $T_B$ presets a value of the vertical size memory (VSM) 67 storing the character size specified each line in the blanking counter 81 and changes it. When the character size (vertical size) of the basic character is doubled, the same scanning is repeated two times and when it is tripled, the scanning is repeated three times. For ensuring further larger size of the character, the scanning is repeated corresponding times. This may be realized by setting the count-up operation of the dot line counter 89 to 1/N time by means of the divider (DIV2) 82.

In order to obtain the character size magnification other than integer times of the basic size, for example, 4/3 times, the blanking time $T_B'$ for the 4/3 character size is given $$T_B' = (T_S + T_{BB}) \times 4/3 - T_S$$

where $T_{BB}$ is the blanking time of the basic character. The equation indicates that, with an invariable period Ts of the horizontal synchronizing signal HSYNC, the blanking time is changed 4/3 times. For the character size of $2 \times 4/3 = 8/3$, the same scanning is repeated two times with $T_B'$ for the blanking time $T_B$.

Turning to FIG. 3, T4 to T6 designate blanking times. At the beginning of the blanking time, the electron beam terminates its scanning to return to its scan start position and waits till the scan start. T1 to T3 are unblanking times. For these unblanking times, the electron beam scans at a constant speed. More specifically, T1 is the final scan of a line, e.g. the nth line, to be recorded on a recording paper. T2 is a first scanning of the character on the (n+1)th line. T3 is the second scanning of the character on the (n+1)th line. Those times are related as follows:

$$T4 = T5 = T6, \text{ and } T1 = T2 \neq T3$$

The LEND signal is produced at the final scanning. The vertical size of the character on the nth line is basic. Assume now that the blanking time is designated T4 (or T5), and that the vertical size of the character on the (n+1)th line is 4/3 time as large as the basic one. The blanking time T6 on the (n+1)th line is $$T6 = (T1 + T4) \times 4/3 - T1$$

The example mentioned above employs $5 \times 7$ for the dot matrix or pattern of each character of generated from the character signal genrator, for simplicity of explanation. To improve the character quality, however, $24 \times 24$ or $32 \times 32$ is employed for the dot matrix in a practical use. Therefore, a character recorded is apparently continuous even though in fact there are no non-luminous spaces between the adjacent dots (compared with FIG. 5). In this case, when each of the sides of a character is magnified two times, three times, . . . n times, compared to that of the basic character, the non-luminous spaces on the character recorded may be eliminated by continuously outputting the video signal from the shift register. In this case, however, the time interval between the starts of one scanning and the succeeding scanning is elongated. Because of the fixed diameter of a dot spot light, the non-luminous spaces each lying between the adjacent dots on the dot matrix are noticeable. Therefore, to record characters integer times, e.g. 2, 3 or 4 times, the basic character, the scanning of the same video signal is repeated corresponding times. At this time, the spot diameter is so set as not to produce the non-luminous spaces.

To record characters other than those integer times the basic character, the time interval between the starts of one scanning and the succeeding scanning is properly set, as mentioned above.

To record characters more than one to less than two times the basic character, the scanning is performed each for one dot and the time interval between the adjacent scannings is, for example, 4/3, 5/3 times or the like that of the basic character.

To record characters more than two to less than three times the basic character, the scanning is repeated two times per dot (the scanning of the same video signals is continuously repeated). Further, the time interval between the starts of the adjacent scannings is set to 3/3, 4/3 and 5/3 times, for example, that of the basic character. For the characters more than three times but less than four times, and more than four times but less than five times, the similar operation is applied.

As described above, the horizontal size of a character is determined by a value set in the preset counter, and the vertical size is determined on the number of continuous repititions of the same video signals and the time interval between the starts of one scanning and another scanning at that time.

In the embodiment mentioned above, the vertical and horizontal sizes of a character are changed with the same ratios. The same technology as mentioned above is applicable for a case where the vertical or the horizontal size is independently changed properly. Accordingly, a vertically long character or a horizontally long character may be recorded by using a single character generator.

The present invention is applicable for not only the electrophotographic recording system with the OFT as mentioned above but also to other proper recording systems such as a dot recording system of the impact type, and an electrostatic recording system of the needle type.

As described above, according to the invention, the vertical and the horizontal sizes of a character to be recorded may be independently changed. Further, the magnification of a character is made not stepwise but continuously even if the vertical or the horizontal size is changed, and a character may be magnified horizontally, vertically and entirely by a single character generator. Moreover, the cost of the hardware is reduced and at this point the recording character configuration changing system is economical.

Obviously many modifications and variations of the present invention are possible in the light of the above teachings. It therefore to be understood that within the scope of the invention may be practiced otherwise than as specifically described.

What is claimed is:

1. A recording character configuration changing system adaptable for use with and electrostatic or an electrophotographic recording system in which a character generator generates dot signals defining characters to be recorded, and an exposure section which forms a line of dot signal characters by repeated horizontal scannings, and the recording of characters corresponding to the dot signals on a recording medium moving at a constant speed, comprising:
   means for changing the vertical dimension of a character by maintaining constant the scanning speed of an exposure scanning of the exposure section but changing a time interval between the starts of one exposure scanning and the next exposure scanning; and
   means for changing the horizontal dimension of a character by an exposure interval between adjacent dot signals in the exposure section.

2. A recording character configuration changing system adaptable for an electrostatic or an electrophotographic recording system including a character generator controlled according to information from an external information source to generate dot signals for each character to be recorded, and an exposure section of a line scanning type, that, upon receiving the dot signals produced, records characters corresponding to the dot signals on a recording medium moving at a constant speed, comprising:
   interface means for latching the information from an exterior information source;
   parallel-serial converting means for converting dot information provided on parallel outputs of said character signal generator into serial information;
   main control means for controlling a time interval between the starts of one exposure scanning to the succeeding exposure scanning while holding constant the scanning speed in order to change vertical dimension of the recording character;
   pulse generating means for supplying a synchronizing signal to said main control means and said parallel-serial converting means; and
   preset counter means connected to said main control means, said pulse generating means and said parallel-serial converting means, for changing exposure intervals each lying between the adjacent light spots of dots in order to change the horizontal dimension of the character.

3. A recording character configuration changing system according to claim 2, wherein, when a number n is set in said preset counter means, the frequency of an output signal from said counter becomes 1/n of the frequency of an output signal from said pulse generating means.

4. A recording character configuration changing system according to claim 2, wherein, for magnifying a basic dimensioned character n (integer) times in its vertical dimension, the exposure scanning is repeated n times.

5. A recording character configuration changing system according to claim 2, wherein, for magnifying the vertical dimension of the basic character n/m times (n>m), a blanking time $T_B'$ of the blanking time for magnifying the basic character n/m times is given by the following expression $$T_B' = (T_S + T_B) \times n/m - T_S$$

where $T_B$ is the blanking time of the basic character dimension, $T_S$ is a scanning time.

6. A recording character configuration changing system according to claim 2, wherein said main control means includes a preset type blanking counter to which any value is settable in order to change the blanking time.

7. A character printing system, comprising:
   a character generator for generating dot signals defining characters to be printed;
   a recording medium arranged to move at a constant speed during printing;
   exposure means for forming, on said recording medium, a line of characters by printing dot signals during a plurality of horizontal scans of said line;
   means for changing the vertical dimension of a character by holding constant the rate of scanning for each scan while changing a time interval between the start of one scan and the next scan; and
   means for changing the horizontal dimension of the character by changing an exposure interval between adjacent dot signals.

8. A character printing system comprising:
   a character generator for generating dot signals defining characters to be printed;
   a recording medium arranged to move at a constant speed during printing;
   exposure means for forming, on said recording medium, a line of characters by printing dot signals defining said characters during a plurality of horizontal scans of said line;
   interface means for latching information from a data source representing characters to be printed;
   parallel-serial converting means for converting dot information generated at parallel outputs of said character generator into serial information;
   main control means for controlling a time interval between the start of one exposure horizontal scanning to the next exposure horizontal scanning while holding constant the scan rate of horizontal scanning in order to change the vertical dimension of a character being printed;
   pulse generating means for supplying a synchronizing signal to said main control means and to said parallel-serial converting means; and
   preset counter means, coupled to said main control means, pulse generating means and parallel-serial converting means, for changing exposure intervals between adjacent light spots of dots in order to change the horizontal dimension of a character.

9. A character printing system according to claim 8 wherein when said present counter means is preset to a number n, the frequency of an output signal therefrom becomes 1/n of the frequency of an output signal from said pulse generating means.

10. A character printing system according to claim 8 wherein for magnifying the vertical dimension of a character n times, the exposure horizontal scanning is repeated n times.

11. A character printing system according to claim 8 wherein for magnifying the vertical dimension of a character n/m times (n greater than m), a blanking time $T_B'$ is given by the following expression:

$$T_B{'}=(T_S+T_B)\times n/m - T_S$$

wherein $T_B$ is the blanking time of the basic character dimension and Ts is a scanning time.

12. A character printing system according to claim 8 wherein said main control means includes a preset type blanking counter presettable to any value for changing the blanking time thereof.

* * * * *